Oct. 3, 1950     T. K. ZEVELY     2,524,744
CORE AND CORE BAR ASSEMBLY FOR BLOCK MOLDS
Filed Aug. 26, 1948     2 Sheets-Sheet 1
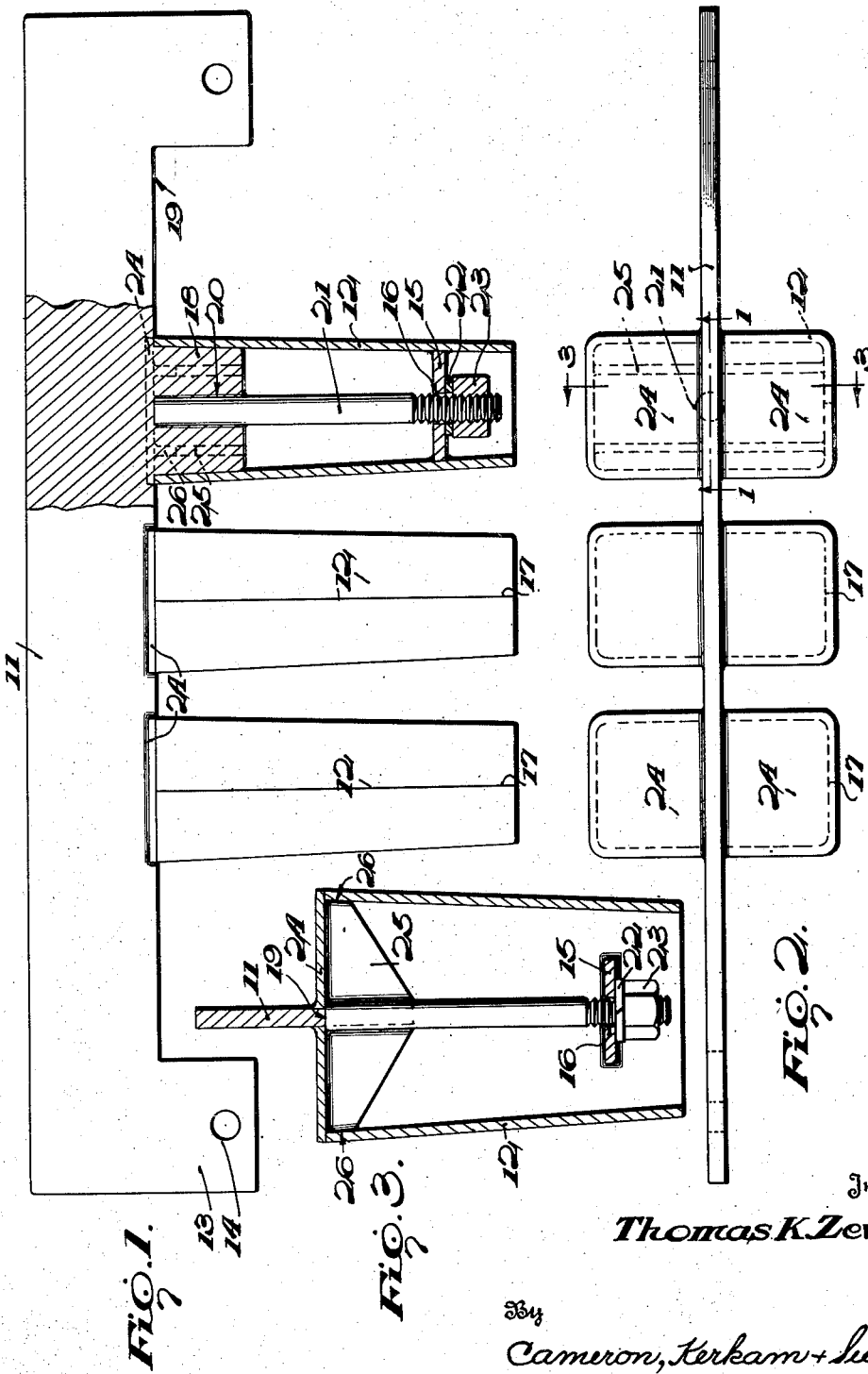
Inventor
*Thomas K. Zevely.*
By
*Cameron, Kerkam + Sutton*
ATTORNEYS

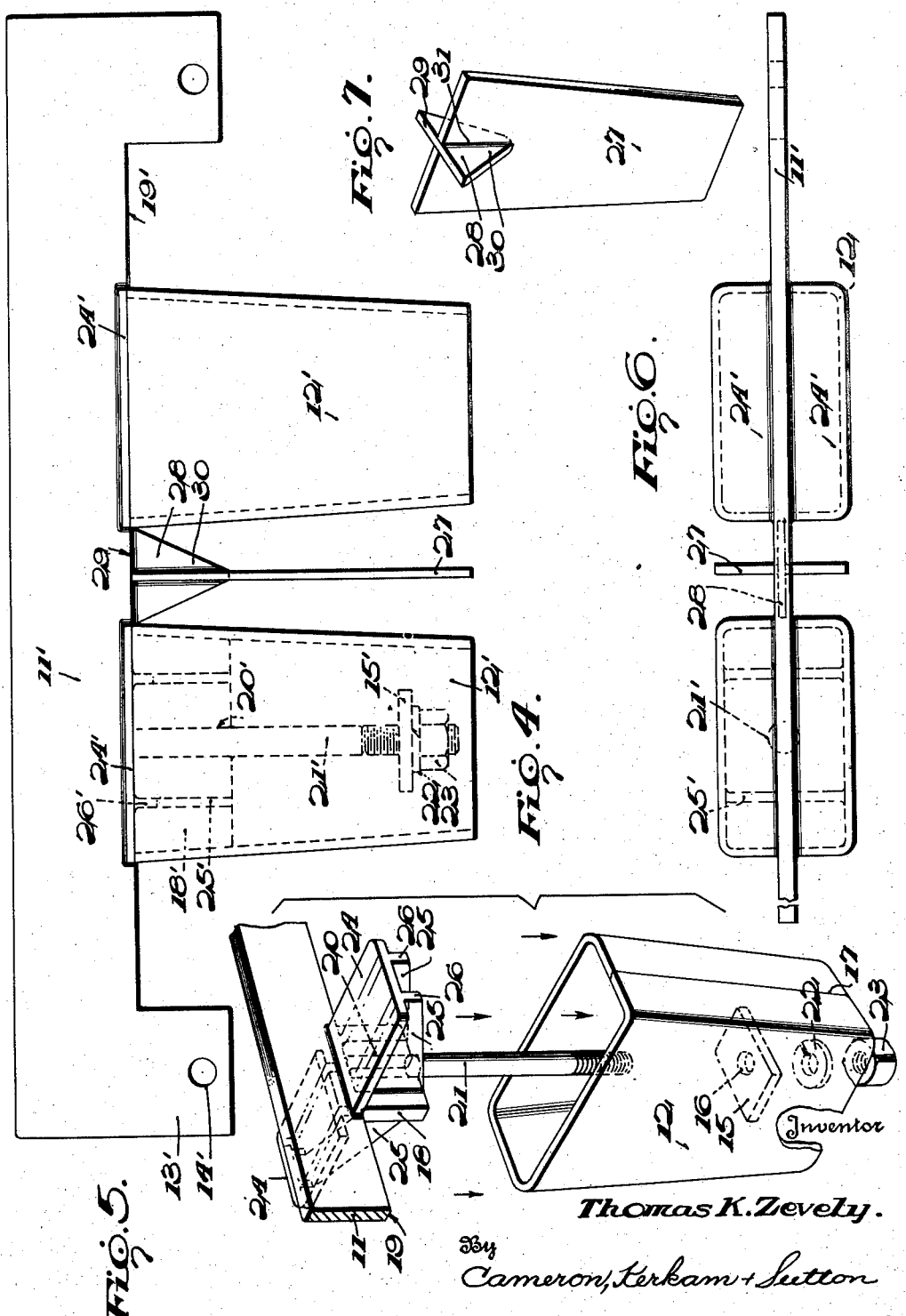

Patented Oct. 3, 1950

2,524,744

UNITED STATES PATENT OFFICE 2,524,744

CORE AND CORE BAR ASSEMBLY FOR BLOCK MOLDS

Thomas K. Zevely, Washington, D. C., assignor to The Washington Brick Co., Muirkirk, Md., a corporation of Maryland Application August 26, 1948, Serial No. 46,266

6 Claims. (Cl. 25—128)

1

This invention relates to cores and core bar assemblies used in the molding of cored building blocks of cinder, concrete and like materials, and has particular application to core equipment for use in automatic block molding machinery.

In the block molding machines now in general use, it is customary to form the cores separately from the core bars and to then fix the cores to the core bars by a welding operation, the top plate of each core being slotted and the core bar having a downwardly extending portion which projects into the upper end of the core through the slot and is welded at its vertical edges to the inside surface of the core wall. Because of the friction developed between the outside surfaces of the cores and the particles of the block forming mixture during manufacture of the blocks, it is necessary to make the cores of pack hardened steel. However, when a hardened core is welded to the core bar as above described, the metal in the vicinity of the welds is softened, with the result that excessive wear takes place in the areas of the core wall adjacent the welds and it becomes necessary to periodically build up these areas with new metal, if full advantage is to be taken of the longer life of the still hardened portions. The building up operation is normally carried out by a welding and grinding procedure which necessitates withdrawing the core bar assembly from service and, of course, leaves the built-up metal softer than the rest of the core.

It is therefore one of the principal objects of the present invention to provide an improved method of connecting cores to core bars which enables a uniformly hardened steel core to be quickly and easily secured to a core bar without the necessity for welding the two elements together.

Another object is to provide a core and core bar assembly of novel construction which facilitates original manufacture of the assembly and enables ready replacement of individual cores whenever necessary.

A further object is to provide a new form of core supporting means for block molding machines which reduces to a minimum the amount of metal in, and the cost of manufacture of, the replaceable cores.

Difficulties have also been encountered in attempting to use block molding machinery of the type heretofore available on the market for the manufacture of blocks which are internally kerfed in order to facilitate the separation by a mason

2 of a standard size block into a plurality of smaller units.

Accordingly, another object of the present invention is the provision of an improved core and core bar assembly which embodies a plurality of hollow cores and at least one intermediate core plate and is particularly well adapted for the manufacture of multiple cell, internally kerfed molded masonry blocks.

A still further object is to provide a novel construction for supporting kerf forming plates from the core bars of block molding machines which is sufficiently strong to withstand the stresses incident to continuous automatic operation without breakage and yet does not interfere with feeding of the block forming mixture.

These and other objects, including the provision of a structurally simple, relatively inexpensive removable core for block molding machines of the character described, will appear more fully upon consideration of the detailed description of the embodiments of the invention that follows. Although only two particular forms of core and core bar assembly are described and illustrated in the accompanying drawings, it is to be expressly understood that these drawings are for the purpose of illustration only and are not to be construed as representing the full scope of the invention which is defined by the appended claims.

Referring now to the drawings, wherein like reference characters indicate like parts throughout the several views, Fig. 1 is a side elevation, partially in section along the line 1—1 of Fig. 2, of one form of core and core bar assembly embodying the present invention;

Fig. 2 is a top plan view of the assembly of Fig. 1;

Fig. 3 is a vertical sectional view taken substantially on the line 3—3 of Fig. 2;

Fig. 4 is an exploded perspective view of a portion of the assembly of Figs. 1 and 2 showing one of the cores and the means by which it is detachably connected to the core bar;

Figs. 5 and 6 are a side elevation and a plan view, respectively, of another embodiment of the invention which includes a kerf forming plate intermediate two hollow cores; and Fig. 7 is a perspective view of the kerf plate of Figs. 5 and 6, including the triangular suspension plate by which the kerf plate is secured to the core bar.

Referring now to Figs. 1-4, there is shown therein a core and core bar assembly of the type adapted for use in automatic block molding machines of known construction, the assembly comprising a flat elongated core bar 11 adapted to be supported on edge in a vertical plane when in use in a molding machine, and three hollow cores 12 which are removably suspended from the bottom of the core bar 11. Although three cores of identical size and shape have been shown in the embodiment illustrated, it will be understood that their size, shape and number form no part of the present invention and may be varied as desired in accordance with the characteristics of the block to be molded. Each end of the core bar 11 is provided with a downwardly extending lug 13, said lugs serving to secure the core bar to the mold box in conventional manner by means of clevis pins (not shown) which pass through holes 14 in the lugs 13.

One feature of the invention resides in the means by which the cores 12 are removably secured to the core bar 11 and maintained in proper position relative thereto, this novel method of connection also resulting in an improved core of extremely simple, inexpensive construction.

As shown, each of the cores 12 is hollow and open at both ends, and consists of a single piece of uniformly hardened steel forming the wall of the core and a web or plate 15 which is fixed to the inner surface of the wall and extends horizontally across the interior of the core adjacent the lower end thereof, the web 15 being provided with a vertically extending opening 16 coaxial with the axis of the core for a purpose hereinafter described. A core of this construction can be readily and economically manufactured by simply bending a steel plate around a mandrel having a shape corresponding to the desired shape of the core, welding the edges of the plate together along a longitudinal seam such as that indicated at 17, and then fixing the web 15 in its proper position within the core in any suitable manner, as by welding it to the inner surface of the core wall. In the embodiment illustrated, the web 15 is fixed to two of the opposite sides of the core but is narrower in the other horizontal dimension than the interior of the core so as not to completely shut off the space above the web from the open lower end of the core. After the two elements of the core have been thus assembled, it is pack hardened in order to provide a uniformly hardened outer surface which will offer the maximum resistance to wear due to the friction which develops between the core and the particles of the block forming mixture during manufacture of the blocks.

The core bar 11 is provided intermediate its ends with a plurality of core entering projections 18 (only one of which is shown in Fig. 1) which are integral with and extend downwardly from the lower edge 19 of the core bar and are adapted to enter the open upper ends of the cores with a sliding or frictional fit. The projections 18 are spaced along the core bar at intervals which produce the desired core arrangement, which arrangement may, of course, be varied as desired. In the core bar assemblies of the prior art, it has been customary to provide core bar projections of this same general character, but to form each core with a top plate integral with the vertical wall and having a slot cut therein to receive the core bar projection, and to weld the edges of the projections to the opposed inner surfaces of the core wall. This prior practice not only fixes the core to the core bar in a practically permanent condition, thereby making core replacement difficult and expensive, but the welding also softens the metal of the core wall in the areas adjacent the welds so that these areas wear faster than the rest of the core and have to be built up with new metal from time to time. To remedy these difficulties, the cores of the present invention are open at the top as well as at the bottom, and are detachably secured to the core bar by novel means next to be described.

As indicated in Figs 1, 3 and 4, each core bar projection 18 is provided with a vertical slot 20 intermediate the side edges of the projection, which slot extends upwardly from the lower edge of the projections to approximately the plane of the lower edge 19 of the core bar. The slot 20 receives the upper end of a bolt 21 which is securely fixed to the projection in any desired manner, as by welding. The bolt 21 is of sufficient length to permit its lower end to extend through the opening 16 in the web 15 of the core 12 when the latter is assembled with the core bar, the lower end of the bolt being threaded and adapted to receive a suitable washer 22 and nut 23 which engage the lower surface of the web 15 and thus fix the core to the core bar.

In order to close the open upper end of the core, the core bar 11 is provided with a pair of horizontally extending core cap plates 24 which may be fixed to the core bar on opposite sides thereof in any suitable manner with their bottom surfaces flush with the lower edge 19 of the core bar. In the embodiment illustrated, in the interest of economy, the core cap plates 24 are separately formed and are welded to the core bar. Each cap plate 24 is also provided with one or more gusset-like plates 25 which are fixed to both the lower surface of the cap plate and the side face of the core bar projection 18 and thereby strengthen the connection between the plate 24 and core bar. As shown, each core cap plate 24 has two gusset-like plates 25 symmetrically positioned on opposite sides of the slot 20 in the projection 18. In addition to their reinforcing function, the plates 25 also serve to guide and properly position the upper end of the core 12 when it is assembled with the core bar. To this end, the outer edge of each plate 25 is provided with a surface 26 which is so designed as to have a sliding or frictional fit with the inner wall surface of the upper end of the core when the assembly is made.

To assemble a core and core bar constructed in accordance with the present invention, it is only necessary to telescope the open-ended core over the bolt 21, core bar projection 18 and plates 25, passing the lower end of the bolt through the opening 16 in the web 15, and to then apply the washer 22 and nut 23 to the lower end of the bolt and tighten up the nut until the upper edge of the core wall is forced into tight engagement with the lower surface of core cap plates 24. It will be obvious that, with this construction, the operation of assembling hollow cores and core bars is greatly simplified, and any individual core can be easily and quickly removed and replaced when necessary.

The core bar assembly illustrated in Figs. 5, 6 and 7 embodies a core bar 11', two open-ended hollow cores 12' and a kerf forming plate 27 positioned between the hollow cores, and is adapted for the manufacture of internally kerfed blocks. Although the cores 12' of this embodiment of the invention are of slightly different size and shape than those of Figs. 1–4 and are connected to the core bar with the longer dimension of their horizontal cross section parallel with, rather than perpendicular to, the core bar, the physical structure of these cores and the means by which they are removably connected to the core bar are similar to the showing of Figs. 1–4. Accordingly, the elements of Figs. 5 and 6 which corresponds to those of Figs. 1–4 have been indicated by the same reference numerals but with a prime designation. It is therefore deemed unnecessary to specifically describe these portions of the assembly of Figs. 5 and 6.

Since the plane of the kerf plate 27 must lie at right angles to that of the core bar 11′, considerable difficulty has been experienced in providing a connection between the kerf plate and the core bar which will be strong enough to avoid breakage under the vibratory and other stresses to which the assembly is subjected during use, and at the same time not interfere with proper delivery of the block forming mixture to the portions of the mold between the hollow cores 12′ and around the kerf plate 27.

In accordance with the present invention, the connection between the kerf plate 27 and the core bar 11′ is made by means of a triangular suspension plate 28 which is fixed along its upper base edge 29 to the lower edge 19′ of the core bar with the apex portion 30 of the plate pointing downwardly and fitting into a vertical slot 31 formed in the upper central portion of kerf plate 27. While the suspension plate 28 may be fixed to the core bar 11′, on the one hand, and to the kerf plate 27, on the other hand, in various ways, it has been found expedient to form the suspension plate 28 separately from the other two elements, to then weld the suspension plate and kerf plate together in the form illustrated in Fig. 7, and finally to weld the base edge 29 of the suspension plate to the lower edge of the core bar. In the embodiment illustrated, it will be noted that the suspension plate 28 is narrower than the core bar 11′ so that the metal of the weld will not project beyond the sides of the core bar and interfere with feed of the block forming mixture as the latter flows down over the core bar.

The advantages of the improved core and core bar structures of the present invention in comparison with those now in general use will be apparent to those skilled in the art from the foregoing description of the particular devices illustrated. It will be evident, however, that the invention is not limited to the specific structural details shown in the accompanying drawings, but is capable of a variety of physical embodiments. For example, it should be obvious that certain of the elements which have been described and illustrated as separately formed might be made integral with one another, or that they might be secured together in various ways other than by the expedient of welding. Similarly, the bolt and nut form of connection between the hollow cores and the core bars may be replaced by equivalent types of connectors, if desired. Various other changes, which will now become apparent to those skilled in the art, may be made in the form, details of construction and arrangement of the parts without departing from the spirit of the invention. Reference is therefore to be had to the appended claims for a definition of the limits of the invention.

What is claimed is:

1. In a core and core bar assembly for block molding machines of the type comprising a flat elongated core bar adapted to be supported on edge in a vertical plane when in use in a molding machine and at least one hollow core suspended from the lower edge of said core bar, means for removably securing the core to the core bar comprising an element fixed to the lower edge of the core bar and extending downwardly into the core, horizontal core cap means fixed to and extending on opposite sides of the core bar and covering the upper end of the core, a member fixed to and extending horizontally across the interior of said core, and means for connecting said downwardly extending element and said member so as to secure the core to said element and hold the upper end thereof in engagement with said core cap means.

2. In a core and core bar assembly for block molding machines of the type comprising a flat elongated core bar adapted to be supported on edge in a vertical plane when in use in a molding machine and at least one hollow core suspended from the lower edge of said core bar, means for removably securing the core to the core bar comprising a bolt fixed to the lower edge of the core bar and extending downwardly into the core, horizontal core cap means fixed to and extending on opposite sides of the core bar and covering the upper end of the core, a member fixed to and extending horizontally across the interior of said core and having an opening therein through which the lower end of said bolt extends, and a nut on the lower end of said bolt beneath said member for securing the core to the bolt and holding the upper end thereof in engagement with said core cap means.

3. In a core and core bar assembly for block molding machines of the type comprising a flat elongated core bar adapted to be supported on edge in a vertical plane when in use in a molding machine and at least one hollow core suspended from the lower edge of said core bar, means for removably securing the core to the core bar comprising a downwardly extending projection from the lower edge of the core bar entering the upper end of the core, a pair of horizontal core cap plates secured to the opposite faces of the core bar and covering the upper end of the core, a bolt fixed to said downwardly extending projection of the core and extending downwardly within the core, a member rigid with and extending horizontally across the interior of said core and having an opening therein through which the lower end of said bolt extends, and a nut on the lower end of said bolt beneath said member for securing the core to the bolt and holding the upper end thereof in engagement with said core cap plates.

4. A core and core bar assembly as defined in claim 1 including means fixed to the lower surface of said core cap means and extending into the upper end of the core in sliding engagement with the inner surface of the core wall for properly positioning the upper end of the core.

5. A core and core bar assembly as defined in claim 3 including elements fixed to the lower surfaces of said core cap plates and extending downwardly into the upper end of the core in sliding engagement with the inner surface of the core wall for maintaining the upper end of the core in proper position.

6. A core and core bar assembly for block molding machines comprising a flat, narrow elongated core bar adapted to be supported on edge in a vertical plane when in use in a molding machine, a plurality of hollow cores connected to said core bar at intervals along the lower edge thereof, at least one relatively thin, flat kerf forming plate extending downwardly from the lower edge of said core bar intermediate two of said hollow cores, the plane of said plate being at right angles to the plane of said core bar and the width of said plate in said plane being substantially greater than the horizontal thickness of said core bar so that said plate extends for substantial distances on both sides of the plane of said core bar, and means for fixing said kerf forming plate to said core bar comprising a relatively thin, flat vertically extending suspension plate coplanar with said core bar and perpendicular to said kerf forming plate, said suspension plate having its upper edge in substantially the same horizontal plane as the upper edge of said kerf forming plate and the upper central portion of said kerf forming plate having a vertical slot formed therein into which said suspension plate extends, the interengaging portions of said suspension plate and said kerf forming plate being welded together and the upper edge of said suspension plate being welded to the lower edge of said core bar.

THOMAS K. ZEVELY.

REFERENCES CITED

The following references are of record in the file of this patent:

UNITED STATES PATENTS

| Number | Name | Date |
|---|---|---|
| 779,219 | Hartwick | Jan. 3, 1905 |
| 791,207 | Palmer | May 30, 1905 |
| 977,025 | Makowski | Nov. 29, 1910 |
| 1,183,896 | Miller | May 23, 1916 |